United States Patent [19]
Kotera

[11] Patent Number: 4,850,818
[45] Date of Patent: Jul. 25, 1989

[54] CORROSION-RESISTANT MAGNET PUMP

[75] Inventor: Masayuki Kotera, Osaka, Japan

[73] Assignee: Seikow Chemical Engineering & Machinery, Ltd., Japan

[21] Appl. No.: 99,884

[22] Filed: Sep. 22, 1987

[30] Foreign Application Priority Data

Sep. 25, 1986 [JP] Japan ............... 61-146923[U]

[51] Int. Cl.[4] .................. F04B 39/02; F04B 39/00
[52] U.S. Cl. .................... 417/366; 417/420; 417/423.14; 416/241 A
[58] Field of Search ........... 416/244 R, 245 A, 204 R, 416/241 A; 411/907, 908, 176, 177, 183; 417/365-370, 420, 423 M, 423 P, 423 S, 423 T, 407; 415/104-106, 110-112, 175, 176

[56] References Cited

U.S. PATENT DOCUMENTS

| | | | |
|---|---|---|---|
| 1,427,807 | 9/1922 | Hableib | 411/176 X |
| 2,041,809 | 9/1934 | Bernhard | 411/176 X |
| 3,420,184 | 1/1969 | Engelsberg et al. | 417/420 |
| 4,013,384 | 3/1977 | Oikawa | 417/370 X |
| 4,047,847 | 9/1977 | Oikawa | 417/420 X |
| 4,052,133 | 10/1977 | Yeater | 416/241 B X |
| 4,080,112 | 3/1978 | Zimmermann | 417/420 |
| 4,152,099 | 5/1979 | Bingler | 384/276 X |
| 4,722,661 | 2/1988 | Mizuno | 417/420 X |

OTHER PUBLICATIONS

Brochure for Magnet Pumps of Kabushiki Kaisha Iwaki "MDX Series".

Primary Examiner—Carlton R. Croyle
Assistant Examiner—Eugene L. Szczecina, Jr.
Attorney, Agent, or Firm—Larson and Taylor

[57] ABSTRACT

Disclosed is a corrosion-resistant magnet pump comprising a front casing, a rear casing provided behind the front casing with a partition wall interposed therebetween, a rotary shaft extending from the front casing into the rear casing and supported by a bearing provided at least in the partition wall, an impeller fixed to the rotary shaft within the front casing, a driven magnet drivingly connected to the rotary shaft within the rear casing and a drive magnet provided outside the rear casing and drivingly rotatable by a motor, the portions of the pump to be exposed to a liquid being made of a corrosion-resistant material, the impeller being fitted around the front end of the rotary shaft and fastened to the rotary shaft by an impeller nut screwed on the front end, the magnet pump being characterized in that the impeller comprises a ceramic insert in the center of the impeller and the remaining portion of corrosion-resistant synthetic resin around the insert, the insert having a rear end face projecting rearward and serving as a thrust bearing face, the partition wall having a thrust bearing face opposed to the rear end face of the insert, the impeller nut and the rotary shaft being made of a corrosion-resistant material.

21 Claims, 6 Drawing Sheets

PRIOR ART

CORROSION-RESISTANT MAGNET PUMP

BACKGROUND OF THE INVENTION

1. Field of the Invention

The present invention relates to a magnet pump, and more particularly to a corrosion-resistant magnet pump comprising a front casing, a rear casing provided behind the front casing with a partition wall interposed therebetween, a rotary shaft extending from the front casing into the rear casing and supported by a bearing provided at least in the partition wall, an impeller fixed to the rotary shaft within the front casing, a driven magnet drivingly connected to the rotary shaft within the rear casing and a drive magnet provided outside the rear casing and drivingly rotatable by a motor, the portions of the pump to be exposed to a liquid being made of a corrosion-resistant material, the impeller being fitted around the front end of the rotary shaft and fastened to the rotary shaft by an impeller nut screwed on the front end.

The term "corrosion-resistant" as used herein refers to the property of being free from or not susceptible to attacking by acids, alkalis, salts, organic solvents, etc., or to resistance to chemicals. This means that the material concerned does not, or is unlikely to, deteriorate, crack, embrittle, discolor, permit penetration of some liquid thereinto or become otherwise degraded.

2. Description of the Prior Art

As shown in FIG. 19, the impeller Im of the corrosion-resistant magnet pump of the type mentioned above usually includes an insert In made of noncorrosive iron or like metal and positioned at the center of the impeller, and a corrosion-resistant synthetic resin portion W (including blades) provided around and formed integrally with the insert. The insert In is fitted around the forward end of a rotary shaft Sh made also of a noncorrosive material and is fastened to the shaft by an impeller nut N of corrosion-resistant synthetic resin in the form of a cap nut and screwed on the shaft end. The rotary shaft Sh is covered with corrosion-resistant synthetic resin at least over a stepped portion a thereof in contact with the impeller Im and over a portion b extending from the portion a. To protect the shaft Sh and the insert In, an O-ring or like seal means Se is interposed between the impeller Im and the impeller nut N, as well as between the impeller Im and the synthetic resin layer over the stepped portion a in contact therewith. Furthermore, a thrust bearing Sb for withstanding the thrust f which is likely to act on the impeller rearwardly of the pump is interposed between the impeller Im and the partition wall (not shown in FIG. 19) between the unillustrated front and the rear casings, or between the rotary shaft and the rear casing (not shown in FIG. 19).

Nevertheless, even if the impeller nut N is tightened up with the use of the O-ring or like seal means S, the impeller nut N will loosen owing to the vibration of the pump, intentional reverse rotation of the pump or the reverse rotation of the pump due to a reverse flow from the discharge pipe toward the pump upon stopping of the pump. Aside from this phenomenon, the seal means will deteriorate during the operation of the pump. The pump therefore has the problem that the liquid handled will attack the rotary shaft S or the impeller insert In if it is corrosive. Moreover, the conventional pump is complex in the construction of the impeller Im and the arrangement around the impeller.

SUMMARY OF THE INVENTION

The main object of the present invention is to provide a corrosion-resistant magnet pump wherein the impeller and the rotary shaft are operable free of attack by liquid, and the impeller and the arrangement therearound are simplified in construction.

Other objects of the invention will become apparent from the following description.

These and other objects of the invention can be fulfilled by a corrosion-resistant magnet pump comprising a front casing, a rear casing provided behind the front casing with a partition wall interposed therebetween, a rotary shaft extending from the front casing into the rear casing and supported by a bearing provided at least in the partition wall, an impeller fixed to the rotary shaft within the front casing, a driven magnet drivingly connected to the rotary shaft within the rear casing and a drive magnet provided outside the rear casing and drivingly rotatable by a motor, the portions of the pump to be exposed to a liquid being made of a corrosion-resistant material, the impeller being fitted around the front end of the rotary shaft and fastened to the rotary shaft by an impeller nut screwed on the front end, the magnet pump being characterized in that the impeller comprises a ceramic insert in the center of the impeller and the remaining portion of corrosion-resistant synthetic resin around the insert, the insert having a rear end face projecting rearward and serving as a thrust bearing face, the partition wall having a thrust bearing face opposed to the rear end face of the insert, the impeller nut and the rotary shaft being made of a corrosion-resistant material.

The rotary shaft may be supported only by the bearing on the partition wall, or by the bearing and another bearing on the rear casing.

The impeller insert has a front end face preferably projecting forward and may be provided by a multiplicity of nut engaging projections in a radial arrangement, the projections gradually projecting toward the impeller nut in the direction of tightening rotation of the impeller nut and subsequently recessed in a direction away from the impeller nut. The corrosion-resistant resin material for the impeller nut may be one lower in hardness than the material of the impeller insert. When the impeller nut having this structure and made of such resin is tightened up, the projections bite into the nut, holding the nut against rotation. In this case, the impeller nut may be formed, on the surface thereof in contact with the insert, with projections engageable with the projections on the insert.

Preferably, the impeller insert has a multiplicity of recessed portions (cutouts, and cavities or holes, or a combination of such portions) for the synthetic resin portion of the impeller to partially lodge in to produce an anchor effect.

Examples of ceramic materials useful for forming the impeller insert are alumina, silicon carbide, zirconia, silicon nitride and the like which are resistant to corrosion.

Examples of corrosion-resistant materials useful for forming the rotary shafts are ceramic materials such as alumina, silicon carbide, zirconia and silicon nitride, and corrosion-resistant metals and alloys thereof including stainless steel, tantalum and alloys thereof, titanium and alloys thereof, nickel-base alloys such as those available under the trademarks of Hastelloy and Inconel, and an iron-base alloy available under the trademark of Carpenter.

When the rotary shaft is made of ceramic material, the rear end portion of the shaft can be made diametrically larger than the other portion thereof in front of the rear end portion to form at the boundary between these portions a stepped portion, which is then serviceable as a thrust bearing face for contact with a bearing bushing or the like for supporting the rotary shaft. Further the wide area of the diametrically large rear end portion can be utilized for drivingly connecting the driven magnet thereto, whereby the driven magnet can be connected to the rotary shaft with enhanced strength and thereby made to withstand a greater rotational torque.

Examples of corrosion-resistant synthetic resins useful for the synthetic resin portion of the impeller and for the impeller nut are fluorocarbon resins such as polytetrafluoroethylene (PTFE), polychlorotrifluoroethylene (PCTFE), polyvinylidene fluoride (PVDF), polyvinyl fluoride (PVF), tetrafluoroethylene-hexafluoropropylene copolymer (FEP), tetrafluoroethylene-ethylene copolymer (ETFE), tetrafluoroethylene-perfluoroalkyl vinyl ether copolymer (PFA), chlorotrifluoroethylene-ethylene copolymer (ECTFE) and tetrafluoroethylene-hexafluoropropylene-perfluoroalkyl vinyl ether copolymer (EPE).

According to the present invention, the impeller insert is made of ceramic material and is resistant to corrosion, the remaining portion of the impeller including the blades is made of corrosion-resistant synthetic resin, and the rotary shaft and the impeller nut are also made of corrosion-resistant material. Unlike the conventional pump, therefore, there is no need to provide seal means for preventing ingress of liquid between the impeller and the impeller nut or between the impeller and the stepped portion of the rotary shaft, and nevertheless, there is no likelihood that these parts will be attacked by liquid. Because there is no need of seal means and further because the rear end face of the impeller insert serves also as a thrust bearing face, the impeller and the components therearound can be of simplified construction.

The pump of the present invention may have lubricant supply channels formed in an intermediate portion of the bearing, bores formed in the partition wall and opposed to the rear plate of the impeller for guiding the liquid within the front casing into the rear casing therethrough, a supply bore formed in the rear casing for supplying a lubricant from outside into the rear casing therethrough, and guide blades provided on at least one of the surface of the partition wall and the surface of the rear casing which define the interior space of the rear casing, for guiding the liquid from the rear casing into the bearing channels. A lubricant can then be supplied to the bearing. Examples of lubricants usable are a portion of the liquid sent to the pump discharge port by the impeller and some other lubricant supplied from outside, such as water. Both of these lubricants are usable in combination. Moreover, the lubricant can be supplied to the bearing forcibly by the guide blades. Accordingly, the pump is usable for a prolonged period of time with good stability for handling slurries, sludge-containing liquids and various other liquids.

DESCRIPTION OF THE PREFERRED EMBODIMENTS

Figure 1:
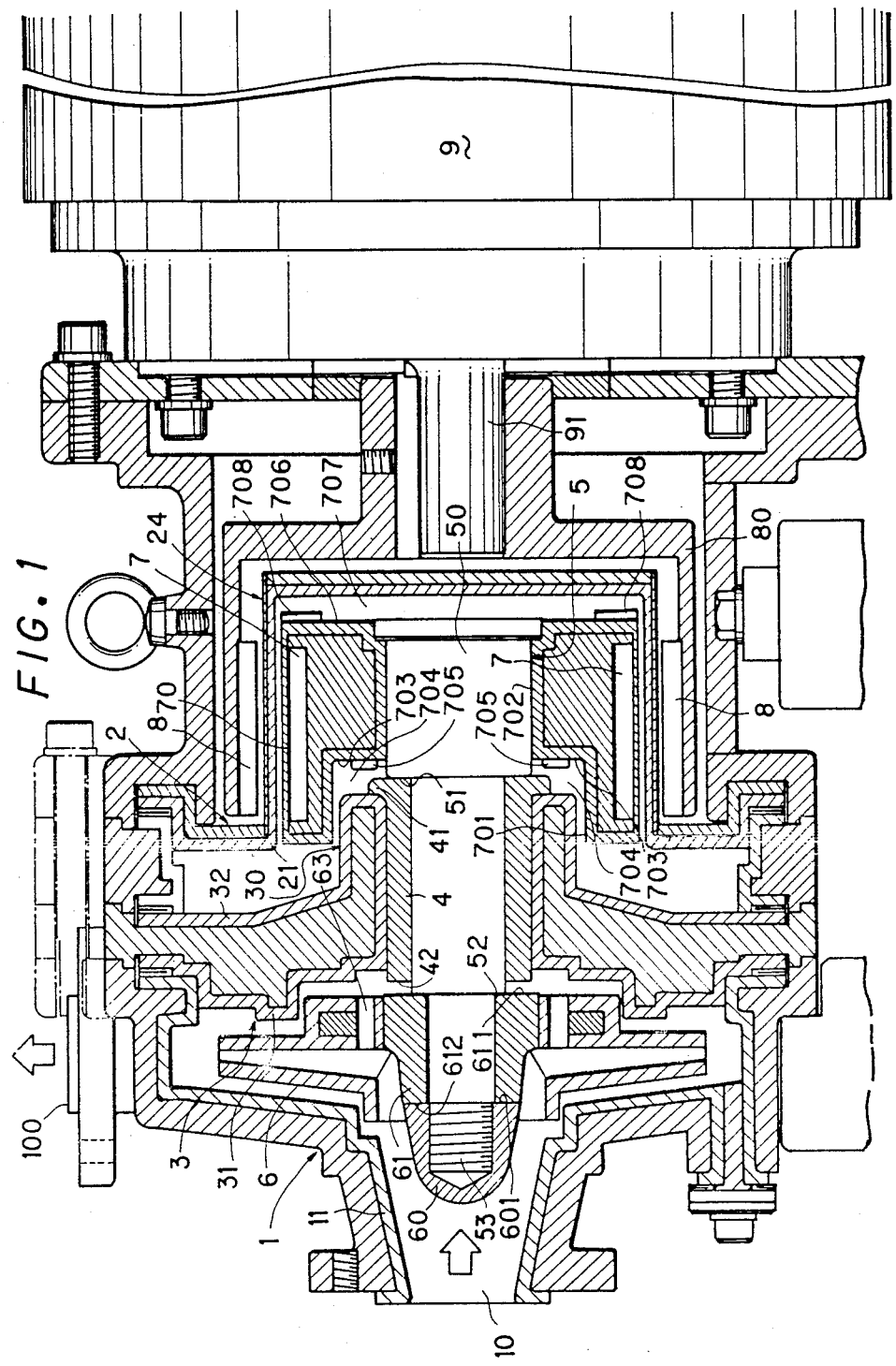
FIG. 1 is a sectional view showing an embodiment of the invention.
Figure 3:
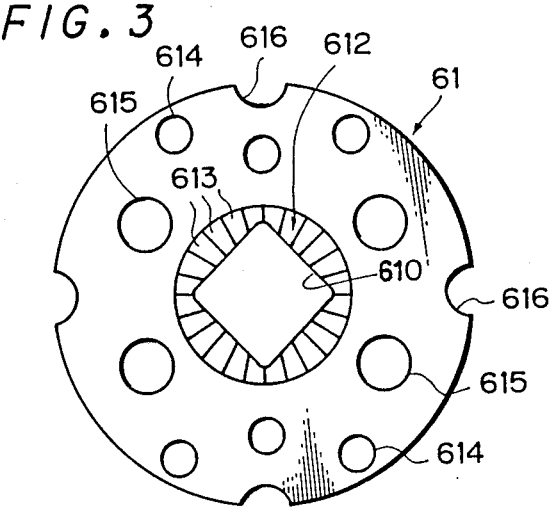
FIG. 3 is a front view showing the impeller insert of FIG. 2.
Figure 2:
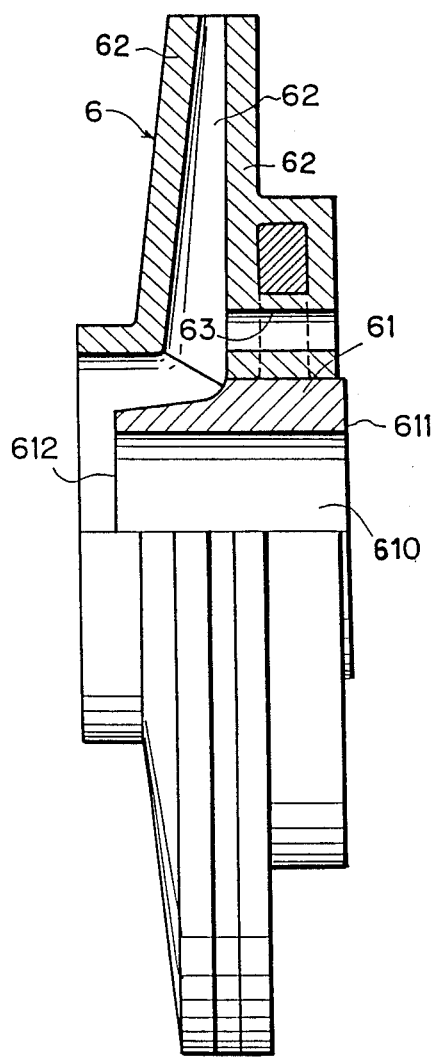
FIG. 2 is a side elevation partly in vertical section of an impeller included in the corrosion-resistant magnet pump shown in FIG. 1.
Figure 4:
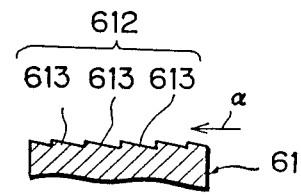
FIG. 4 is a development in section showing projections on the front end face of the insert of FIG. 3.

FIGS. 1 to 11 show an embodiment of corrosion-resistant magnet pump of the invention, and FIGS. 12 to 18 show another embodiment. Throughout the drawings, like parts are designated by like reference numerals.

The illustrated pump is a corrosion-resistant centrifugal magnet pump useful for handling slurries and sludge-containing corrosive liquids.

The pump of FIG. 1 comprises a front casing 1, a rear casing 2, a partition wall 3 between the two casings, a bearing bushing 4 supported by a bearing holder 30 provided in the partition wall 3, a rotary shaft 5 rotatably supported by the bearing bushing 4 and extending from the front casing 1 into the rear casing 2, an impeller 6 fixed to the rotary shaft 5 within the front casing 1, a driven magnet 7 drivingly connected to the shaft 5 within the rear casing 2 and a drive magnet 8 provided around the rear casing.

The front casing 1, the rear casing 2 and the partition wall 3 are respectively covered with surface layers 11, 21, and 31, 32 which are to be exposed to a liquid. These layers are made of a fluorocarbon resin such as PTFE, PCTFE, PVDF, PVF, FEP, ETFE, PFE, ECTFE or EPE, or some other corrosion-resistant synthetic resin. The other portions of these members are made of iron or other suitable metal. The bearing bushing 4 is made of a corrosion-resistant material. Examples of such materials are ceramic materials including alumina, silicon carbide, silicon nitride and zirconia; synthetic resins including fluorocarbon resins such as PTFE, PCTFE, PVDF, PVF, FEP, ETFE, PFA, ECTFE and EPE, with or without a filler (e.g. carbon) incorporated therein, polyamide resins known under the trademarks of Nylon, etc. and superhigh-density polyethylene; and carbon and high-density carbon. The bushing 4 is generally in the form of a hollow cylinder and has at its rear end a flange 41 in contact with and supported by the rear end face of the bearing holder 30. The bushing 4 has a front end face 42 opposed to the front casing 1. The flange 41 is also in contact with a stepped portion 51 of a large-diameter portion 50 of the shaft 5 at its rear end.

The rotary shaft 5 is made of a ceramic material such as alumina, silicon carbide, silicon nitride or zirconia and is supported at an intermediate portion thereof by the bushing 4 as already mentioned. Examples of other materials useful for the shaft 5 are corrosion-resistant metals and alloys thereof such as stainless steel, tantalum and alloys thereof, titanium and alloys thereof, nickel-base alloys available under the trademarks of Hastelloy, Inconel, etc. and iron-base alloy available under the trademark of Carpenter.

The front end of the shaft 5 is positioned within the front casing 1. The impeller 6 is fitted around the front end which is square in cross section, and is in contact with a stepped portion 52 of the shaft 5. In cross section, the shaft front end need not always be square but may be of other polygonal shape, e.g. pentagonal. Alternatively, the impeller may be keyed to the shaft end.

The impeller 6 is fastened to the shaft by an impeller nut 60 in the form of a cap nut and screwed on the shaft end which is externally threaded as indicated at 53.

The impeller 6 comprises an insert 61 positioned in the center thereof, and the remaining corrosion-resistant synthetic resin portion (including blades) 62 around the insert. The insert 61 is made of a ceramic material such as alumina, silicon carbide, silicon nitride or zirconia. The resin portion 62 is made of a fluorocarbon resin such as PTFE, PCTFE, PVDF, PVF, FEP, ETFE, PFA, ECTFE or EPE or other corrosion-resistant synthetic resin.

The insert 61 has a shaft bore 610 conforming to the front end of the shaft 5 in cross section and further has a smooth rear end face 611 projecting rearward and serving as a bearing face for thrust acting rearwardly of the impeller 6. The thrust bearing face 611 is opposed to the front end face 42 of the bearing bushing 4 on the partition wall 3 serving as a thrust bearing face.

The insert 61 has a front end face 612 projecting forward and formed with a multiplicity of nut engaging projections 613 in a radial arrangement. The projections 613 gradually project toward the impeller nut 60 in the direction α of tightening rotation of the nut and subsequently recessed in a direction away from the impeller nut 6.

The impeller nut 60 is made of a corrosion-resistant material, such as one of the fluorocarbon resins mentioned above, which is lower in hardness than the material of the impeller insert 61, so that when the nut 60 is tightened up, the projections 613 on the front end face of the impeller insert 61 bite into the nut end face 601. Consequently, the nut will not be readily loosened by the vibration of the pump or when the pump is reversely rotated, intentionally or by a reverse flow from the discharge pipe toward the pump upon stopping of the pump.

Figure 5:
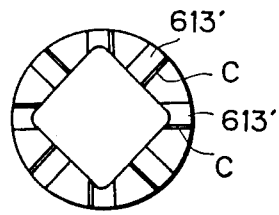
FIG. 5 is a view showing another example of projections on the front end face of the insert.
Figure 6:
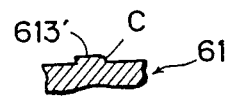
FIG. 6 is a view in section showing the projection of FIG. 5.
Figure 7:
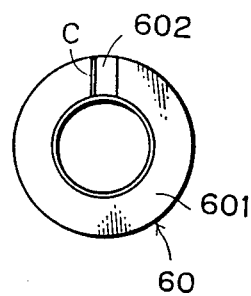
FIG. 7 is a rear view showing another example of impeller nut.
Figure 8:
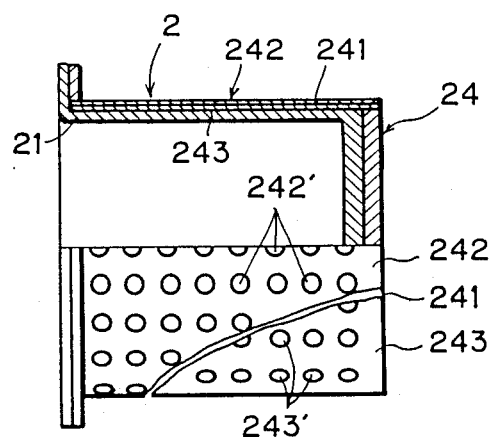
FIG. 8 is a side elevation partly broken away and showing a rear casing included in the pump of FIG. 1.

Instead of the projections 613, projections 613' may be formed on the front end face 612 of the insert 60 as seen in FIGS. 5 and 6. Each projection 613' is slightly chamfered, as indicated at C, at one side thereof opposite to the direction α. The end face 601 of the impeller nut 60 may also be formed with at least one projection 602, such as one resembling the projection 613', which is chamfered at the side thereof opposite to the chamfered side of the projection 613', as indicated at C in FIG. 7.

The impeller insert 61 is formed with a multiplicity of recessed portions (small holes 614, large holes 615, cutouts 616, etc.), in which the synthetic resin portion 62 partially lodges to produce an anchor effect. Consequently, the insert 61 is firmly bonded to the resin portion 62.

Indicated at 63 are balance holes for holding the impeller in balance against thrust acting toward a pump suction port 10.

The driven magnet 7 is drivingly connected to the rotary shaft 5 by a magnet holding member 70 made of a corrosion-resistant synthetic resin such as fluorocarbon resin. Since the magnet 7 is thus connected to the large-diameter portion 50 of the shaft 5 over a wide area, the magnet can be connected thereto with correspondingly great strength and thereby made to withstand a great rotational torque. The large-diameter portion 50 forms the stepped portion 51, which provides a thrust bearing face opposed to the bushing 4 since the shaft is made of ceramic material as already stated. The magnet 7 is enclosed in the member 70.

The drive magnet 8 is connected to the drive shaft 91 of a motor 9 by a suitable magnet holding member 80.

The motor 9, when energized, rotates the drive magnet 8, which in turn rotates the driven magnet 7, therefore the rotary shaft 5 and the impeller 6. A liquid is drawn into the front casing 1 through the pump suction port 10 and delivered from a pump discharge port 100.

The magnet holding member 70, which is in the form of a hollow cylinder of uniform outside diameter, has a small inside diameter portion 702 and a large inside diameter portion 701 extending forwardly of the small inside diameter portion 702. The small inside diameter portion 702 is drivingly connected to the rear end portion of the rotary shaft 5 axially thereof. The front end portion of the large inside diameter portion 701 is positioned around the rear end portion, circular in cross section, of the bearing holder 30, with a small clearance formed therebetween.

Figure 9:
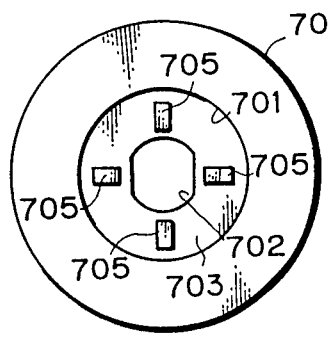
FIG. 9 is a front view showing a driven magnet holding member of the pump.

A stepped portion 703 extending from the portion 701 to the portion 702 is provided with radial blades 705 for giving an increased liquid pressure to a space 704 in front of the stepped portion (see FIGS. 1 and 9).

Figure 10:
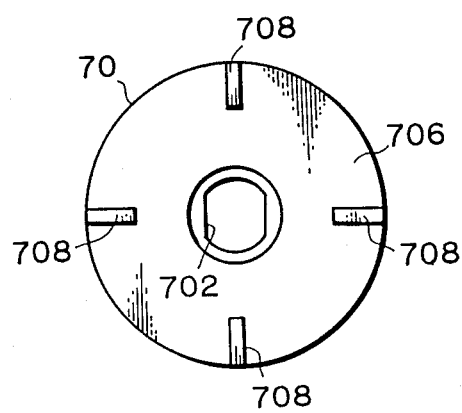
FIG. 10 is a rear view of the member of FIG. 9.

The holding member 70 has a rear end face 706 which is provided with radial blades 708 arranged along its outer periphery for giving a reduced liquid pressure to a space 707 in the rear of the end face 706 (FIGS. 1 and 10).

The rear casing 2 includes the aforementioned surface layer 21 of synthetic resin and a cover 24 fitted around the layer 21 and made of a nonmagnetic metal such as nickel-base alloys available under the trademark of Hastelloy, Inconel or the like.

The rear casing 2 has a bottom opposed to the driven magnet holding member 70.

When the member 70 is rotated for the operation of the pump, the blades 705 act to give an increased liquid pressure to the space 704 in front of the stepped portion 703, while the blades 708 act to give a reduced liquid pressure to the rear space 707. Consequently, a liquid pressure difference occurs between the spaces in front and rear of the member 70, exerting on the member 70 thrust acting in a direction away from the pump suction port 10. This correspondingly diminishes the thrust acting toward the pump suction port 10.

Figure 11:
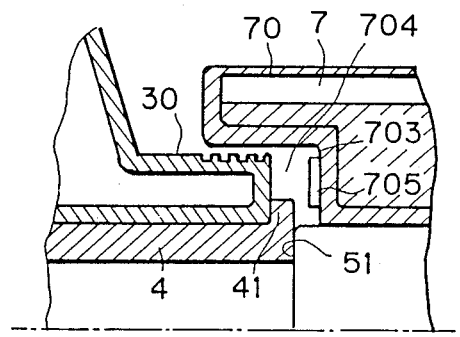
FIG. 11 is a view showing a labyrinth between a bearing holder on a partition wall and the driven magnet holding member.
Figure 15:
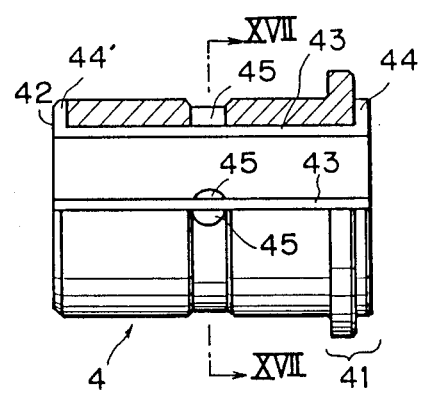
FIG. 15 is a side elevation partly in vertical section and showing the bearing bushing of the pump.

The clearance between the rear end portion of the bearing holder 30 and the front end portion of the magnet holding member 70 provided therearound can be made to have a labyrinth, for example, as shown in FIG. 11. The labyrinth then gives a further increased liquid pressure to the space 704 in front of the stepped portion of the member 70 to mitigate the thrust toward the suction port 10 to a greater extent.

The cylindrical portion 24 of the metal cover of the rear casing 2 which portion is positioned between the driven and drive magnets 7 and 8 and greatly affected by the magnetic flux comprises two metal layers 242, 243 and an electrical insulation layer 241 sandwiched therebetween. The metal layers 242, 243 are formed with a multiplicity of holes 242', 243', respectively, which are so arranged that the holes of one layer do not overlap those of the other layer. The metal layers 242, 243 can be obtained by shaping a thin metal sheet into a cylinder. The holes 242', 243' can be easily formed by punching the sheet before shaping.

The illustrated insulation layer 241 is obtained by fitting a heat-shrinkable electrical insulation tube (for example of silicone resin, vinyl chloride resin, PFA, FEP or the like) around the inner metal layer 243 and thereafter heating the metal layer. The metal layer 242 is then fitted over the resulting assembly.

Instead of the tube 241, a coating composition of epoxy resin, vinyl chloride resin or acrylic resin, varnish of silicone resin or fluorocarbon resin or the like may be applied to the inner metal layer 243 to form an electrical insulation coating layer thereon. The tube and the coating layer may be provided in combination.

As compared with a single metal layer equal in thickness to the combined thickness of the metal layers 242, 243 and formed with holes in the same ratio as the holes 242', 243', the rear casing 2 of the above construction is reduced by a maximum of about 50% in eddy current loss while retaining the same strength or pressure resistance as the single metal layer.

Figure 12:
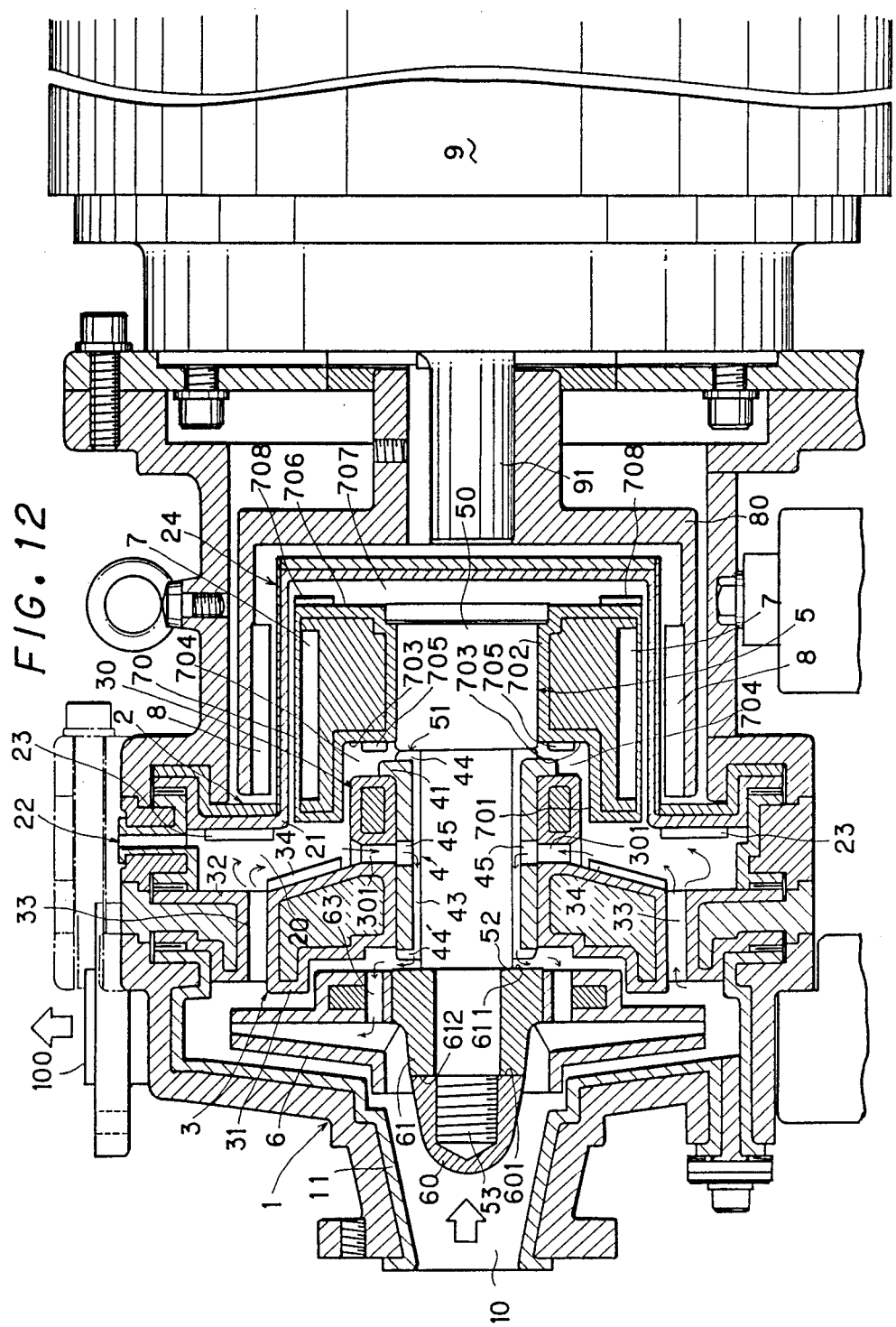
FIG. 12 is a sectional view showing another embodiment of the invention.
Figure 13:
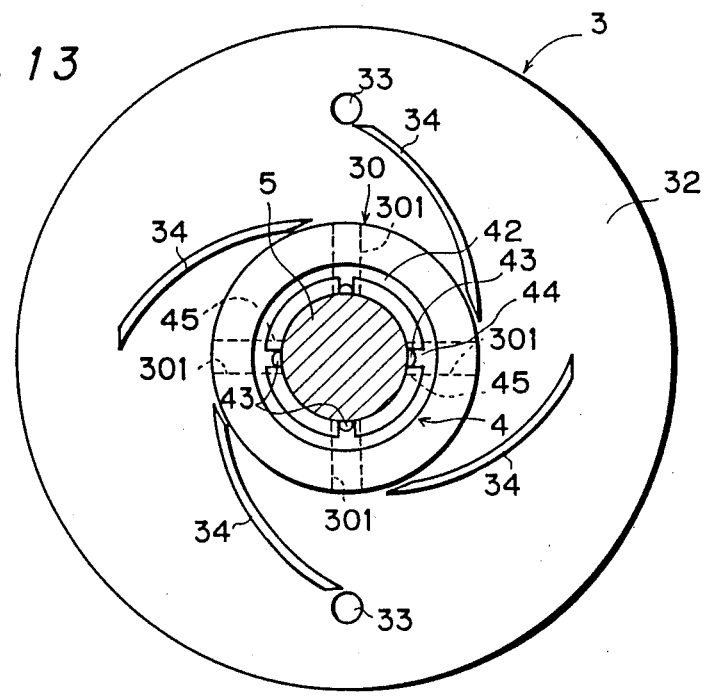
FIG. 13 is a view showing part of a partition wall, bearing holder and bearing bushing included in the corrosion-resistant pump of FIG. 12 as they are seen from the rear side.
Figure 14:
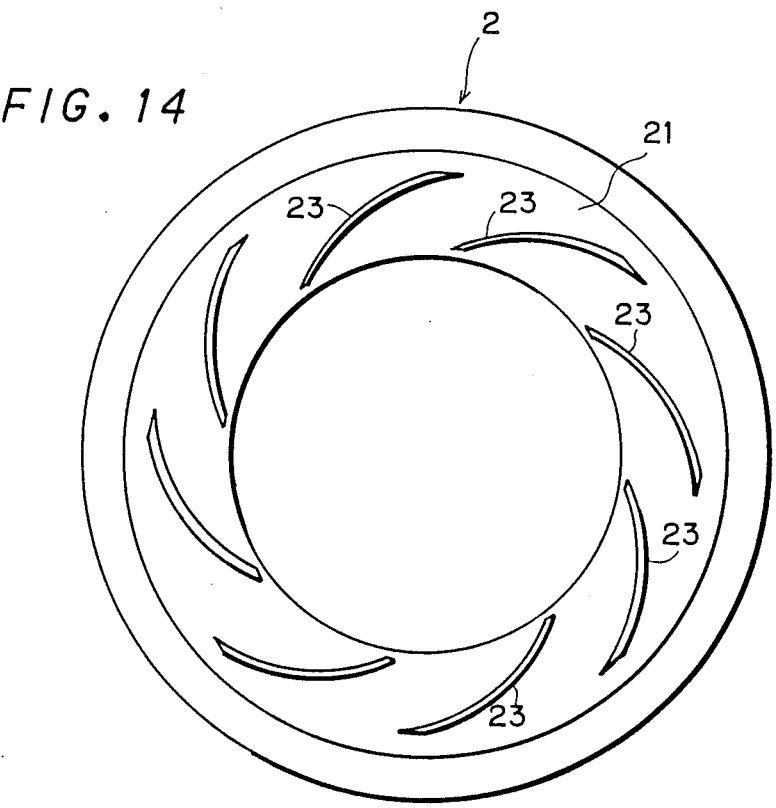
FIG. 14 is a fragmentary front view showing a rear casing included in the pump of FIG. 12.
Figure 16:
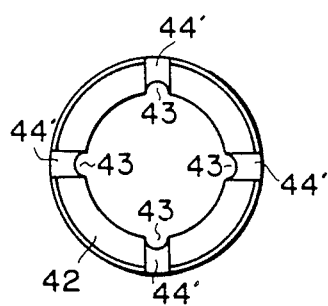
FIG. 16 is a front view showing the bearing bushing of FIG. 15.
Figure 17:
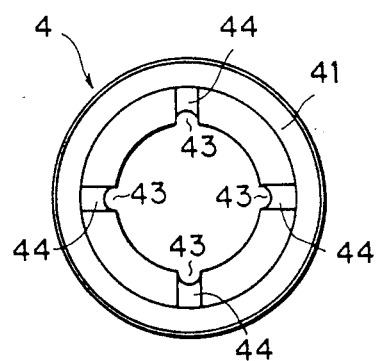
FIG. 17 is a rear view showing the bearing bushing of FIG. 15.
Figure 18:
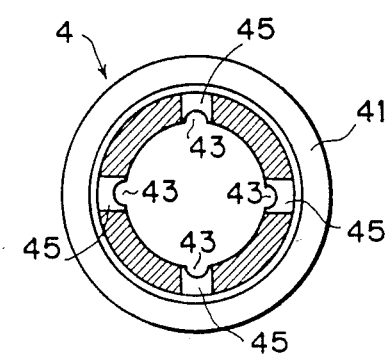
FIG. 18 is a view in section taken along the line XVIII—XVIII in FIG. 15.
Figure 19:
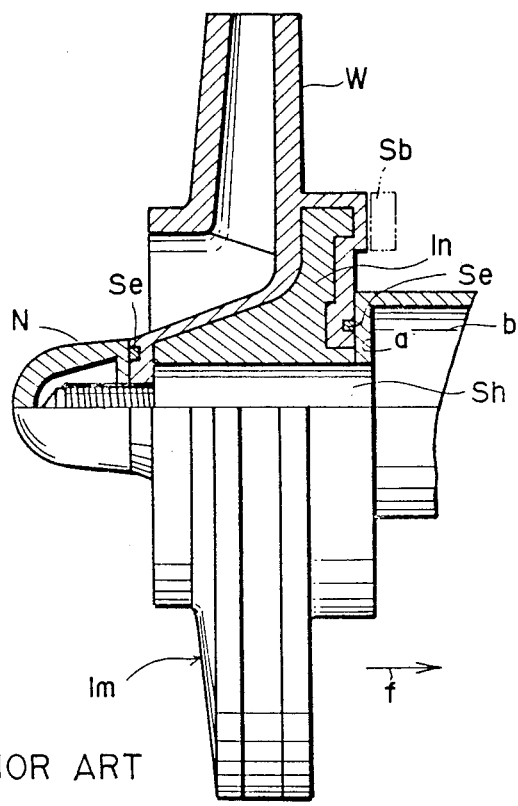
FIG. 19 is a view showing the impeller and an arrangement therearound of a conventional pump.

FIG. 12 shows another pump which has substantially the same construction as the pump of FIG. 1 except that the pump of FIG. 12 has lubricant supplying means including the openings, channels, ports, bores, grooves and guide blades to be described below.

With reference to FIGS. 15 to 18, the bearing bushing 4 of the pump of FIG. 12 has four liquid channels 43 formed in its inner surface longitudinally of the rotary shaft 5 and spaced apart equidistantly, radial grooves 44, 44' formed respectively in the rear end face of the flange 41 and the front end face 42 and communicating with the respective liquid channels 43, and inlet ports 45 formed in its wall at an intermediate portion thereof and communicating with the respective liquid channels 43. In corresponding relation to the inlet ports 45, the bearing holder 30 of the partition wall 3 is formed with openings 301 for causing the inlet ports 45 to communicate with the interior space of the rear casing 2 therethrough.

When required, the liquid channels 43 may helically or otherwise extend longitudinally of the rotary shaft 5, while the radial grooves 44, 44' need not always be accurately arranged radially of the bushing 4.

The partition wall 3 of the pump of FIG. 12 has upper and lower two bores 33 opposed to the rear plate of the impeller 6 for guiding the liquid within the front casing 1 into the rear casing 2 therethrough.

The rear casing 2 has a supply bore 22 for supplying a lubricant from outside into the rear casing therethrough.

The partition wall 3 has four guide blades 34 on the surface thereof opposed to an interior space 20 of the rear casing 2. These guide blades 34 are spaced apart equidistantly around the bearing holder 30 and extend toward the respective openings 301 formed in the bearing holder 30. Two of the four blades each extend from a position close to the outlet of the liquid guiding bores 33 in the partition wall 3. A plurality of guide blades 23 are also formed on the wall surface opposed to the interior space 20 of the rear casing 2. These blades 23 are spaced apart equidistantly around the bearing holder 30 and arranged at a larger distance therefrom than the blades 34 on the partition wall 3. All the blades 23 extend toward the holder 30. One of the blades 23 extends from a position close to the supply bore 22 in the rear casing 2.

The guide blades 34 and 23 are all made of corrosion-resistant synthetic resin.

When the liquid through the pump is usable as it is as a bearing lubricant, the supply bore 22 is closed during the operation of the pump, and only the liquid in the front casing 1 is supplied to the rear casing 2 through the guiding bores 33 as the lubricant. If the liquid is not usable as it is as the lubricant, other lubricant (such as water) is supplied from the supply bore 22 in the rear casing to dilute the liquid, or alternatively, the lubricant is fed from the supply bore 22 only, with the liquid guiding bores 33 closed in a suitable manner.

The liquid within the rear casing is whirled by the rotation of the driven magnet holding member 70. The liquid supplied from the guiding bores 33 is forcibly guided into the openings 301 in the bearing holder 30 chiefly by the guide blades 34. The liquid supplied from the bore 22 is similarly guided into the openings 301 mainly by the guide blades 23. The liquid then flows into the bearing bushing 4 via the inlet ports 45 for lubrication and cooling.

I claim:

1. A corrosion-resistant magnet pump comprising a front casing, a rear casing provided behind the front casing with a partition wall interposed therebetween, a rotary shaft extending from the front casing into the rear casing and supported by a bearing provided at least in the partition wall, an impeller fixed to the rotary shaft within the front casing, a driven magnet drivingly connected to the rotary shaft within the rear casing, and a drive magnet provided outside the rear casing and drivingly rotatable by a motor, the portions of the pump to be exposed to a liquid being made of a corrosion-resistant material, the magnet pump being characterized in that the impeller is fixedly fastened to the rotary shaft by an impeller nut screwed on the front end of the rotary shaft and comprises a ceramic insert in the center of the impeller and the remaining portion of corrosion-resistant synthetic resin around the insert, the insert having a rear end face projecting rearward and serving as a thrust bearing face, the partition wall having a thrust bearing face opposed to the rear end face of the insert, the rotary shaft being made of a corrosion-resistant material, the impeller nut being made of a corrosion-resistant synthetic resin lower in hardness than the material of the impeller insert, the impeller insert having a front end face projecting forward and formed with a multiplicity of nut engaging projections in a radial arrangement, the nut engaging projections gradually projecting toward the impeller nut in the direction of tightening rotation of the impeller nut and subsequently recessed in a direction away from the impeller nut.

2. A pump as defined in claim 1 wherein the impeller nut is formed on the surface thereof in contact with the impeller insert with at least one projection engageable with the projection on the insert.

3. A pump as defined claim 1 wherein the impeller insert is formed in its surface with recesses, and the synthetic resin portion around the insert partially lodges in the recesses.

4. A pump as defined in claim 1 wherein the ceramic material forming the impeller insert is a material selected from one of alumina, silicon carbide, zirconia and silicon nitride.

5. A pump as defined in claim 1 wherein the corrosion-resistant synthetic resin portion of the impeller is made of synthetic resin selected from one of polytetrafluoroethylene, polychlorotrifluoroethylene, polyvinylidene fluoride, polyvinyl fluoride, tetrafluoroethylene-hexafluoropropylene copolymer, tetrafluoroethylene-perfluoroalkyl vinyl ether copolymer, tetrafluoroethylene-ethylene copolymer, chlorotrifluoroethylene-ethylene copolymer and tetrafluoroethylenehexafluoropropylene-perfluoroalkyl vinyl ether copolymer.

6. A pump as defined in claim 1 wherein the impeller nut is made of synthetic resin selected from one of polytetrafluoroethylene, polychlorotrifluoroethylene, polyvinylidene fluoride, polyvinyl fluoride, tetrafluoroethylene-hexafluoropropylene copolymer, tetrafluoroethylene-ethylene copolymer, tetrafluoroethylene-perfluoroalkyl vinyl ether copolymer, chlorotrifluoroethylene-ethylene copolymer and tetrafluoroethylene-hexafluoropropylene-perfluoroalkyl vinyl ether copolymer.

7. A pump as defined in claim 1 wherein the rotary shaft is made of a ceramic material selected from one of alumina, silicon carbide, zirconia and silicon nitride.

8. A pump as defined in claim 1 wherein the rotary shaft has a rear end portion having a larger diameter than the other portion thereof in front of the rear end portion and is formed at the boundary between these portions a stepped portion providing a thrust bearing face.

9. A pump as defined in claim 1 which includes a driven magnet holding member, a space being formed between the rear end face of the driven magnet holding member and the rear wall of the rear casing, the driven magnet holding member having a small inside diameter portion drivingly connected to the rotary shaft axially thereof and a large inside diameter portion extending forwardly of the small inside diameter portion, the front end portion of the large inside diameter portion being positioned around the bearing holder with a small clearance formed therebetween, the stepped portion extending from the large inside diameter portion to the small inside diameter portion being provided with blades for giving an increased liquid pressure to a space between the stepped portion and the small clearance of the rear casing.

10. A corrosion-resistant magnet pump comprising a front casing, a rear casing provided behind the front casing with a partition wall interposed therebetween, a rotary shaft extending from the front casing into the rear casing and supported by a bearing provided at least in the partition wall, an impeller fixed to the rotary shaft within the front casing, a driven magnet drivingly connected to the rotary shaft within the rear casing, and a drive magnet provided outside the rear casing and drivingly rotatable by a motor, the portions of the pump to be exposed to a liquid being made of a corrosion-resistant material, the magnet pump being characterized in that the impeller is fixedly fastened to the rotary shaft by an impeller nut screwed on the front end of the rotary shaft and comprises a ceramic insert in the center of the impeller and the remaining portion of corrosion-resistant synthetic resin around the insert, the insert having a rear end face projecting rearward and serving as a thrust bearing face, the partition wall have a thrust bearing face opposed to the rear end face of the insert, the rotary shaft the impeller not being made of a corrosion-resistant synthetic resin lower in hardness than the material of being made of a corrosion-resistant material, the impeller insert, the impeller insert having a front end face projecting forward and formed with a multiplicity of nut engaging projections in a radial arrangement, the nut engaging projectings gradually projecting toward the impeller nut in the direction of tightening rotation of the impeller nut and subsequently recessed in a direction away from the impeller nut, the bearing bearing formed at an intermediate portion thereof with lubricant supply channels, the partition wall having bores opposed to the rear plate of the impeller for guiding the liquid within the front casing into the rear casing therethrough, the rear casing having a supply bore for supplying a lubricant from outside into the rear casing therethrough, guide blades for guiding the liquid from the rear casing into the bearing channels being provided on at least one of the surface of the partition wall and the surface of the rear casing defining the interior space of the rear casing.

11. A pump as defined in claim 10 wherein the guide blades provided on the partition wall surface extend toward the bearing channels, and at least one of the guide blades extends from a position close to the outlet of the guiding bore in the partition wall.

12. A pump as defined in claim 11 wherein the guide blades provided on the surface of the rear casing extend toward the bearing, and at least one of the guide blades extends from a position close to the supply bore of the rear casing.

13. A pump as defined in claim 11 wherein the bearing has a bearing holder provided on the partition wall and a bearing bushing held by the holder, and the bushing has liquid channels formed in its inner surface and extending longitudinally of the rotary shaft, radial grooves formed in its opposite end faces and each communicating with the liquid channel and, inlet ports formed in the wall of the bushing at an intermediate portion thereof and each communicating with the liquid channel, the bearing holder being formed with openings holding the inlet ports in communication with the interior space of the rear casing, the inlet ports and the openings providing the lubricant supply channels.

14. A pump as defined in claim 13 wherein the impeller nut is formed on the surface thereof in contact with the impeller insert with at least one projection engageable with the projection on the insert.

15. A pump as defined in claim 11 wherein the impeller insert is formed in its surface with recesses, and the synthetic resin portion around the insert partially lodges in the recesses.

16. A pump as defined in any one of claim 11 wherein the ceramic material forming the impeller insert is a material selected from alumina, silicon carbide, zirconia and silicon nitride.

17. A pump as defined in any one of claim 11 wherein the corrosion-resistant synthetic resin portion of the impeller is made of synthetic resin selected from polytetrafluoroethylene, polychlorotrifluoroethylene, polyvinylidene fluoride, polyvinyl fluoride, tetrafluoroethylene-hexafluoropropylene copolymer, tetrafluoroethylene-perfluoroalkyl vinyl ether copolymer, tetrafluoroethylene-ethylene copolymer, chlorotrifluoroethylene-ethylene copolymer and tetrafluoroethylenehexafluoropropylene-perfluoroalkyl vinyl ether copolymer.

18. A pump as defined in claims 11 wherein the impeller nut is made of synthetic resin selected from polytetrafluoroethylene, polychlorotrifluoroethylene, polyvinylidene fluoride, polyvinyl fluoride, tetrafluoroethylene-hexafluoropropylene copolymer, tetrafluoroethylene-perfluoroalkyl vinyl ether copolymer, chlorotrifluoroethylene-ethylene copolymer and tetrafluoroethylene-hexafluoropropylene-perfluoroalkyl vinyl ether copolymer.

19. A pump as defined in any one of claim 11 wherein the rotary shaft is made of a ceramic material selected from alumina, silicon carbide, zirconia and silicon nitride.

20. A pump as defined in any one of claim 11 wherein the rotary shaft has a rear end portion having a larger diameter than the other portion thereof in front of the rear end portion and is formed at the boundary between these portions a stepped portion providing a thrust bearing face.

21. A pump as defined in claim 11 which includes a driven magnet holding member, a space being formed between the rear end face of the driven magnet holding member and the rear wall of the rear casing, the driven magnet holding member having a small inside diameter portion drivingly connected to the rotary shaft axially thereof and a large inside diameter portion extending forwardly of the small inside diameter portion, the front end portion of the large inside diameter portion being positioned around the bearing holder with a small clearance formed therebetween, the stepped portion extending from the large inside diameter portion to the small inside diameter portion being provided with blades for giving an increased liquid pressure to a space between the stepped portion and the small clearance, and the bearing holder being provided with blades in the rear of the end face thereof for giving a reduced liquid pressure to the space between the rear of the end face thereof and the rear wall of the rear casing.

* * * * *